United States Patent [19]

Garbutt et al.

[11] 4,018,936
[45] Apr. 19, 1977

[54] GLUTEN TREATMENT

[75] Inventors: John T. Garbutt; Ronald C. Malzahn; Alpha L. Morehouse, all of Muscatine, Iowa

[73] Assignee: Grain Processing Corporation, Muscatine, Iowa

[22] Filed: Oct. 16, 1975

[21] Appl. No.: 622,874

[52] U.S. Cl. ............................... 426/656; 426/430; 260/112 G
[51] Int. Cl.² .......................................... A23J 3/00
[58] Field of Search .......... 426/656, 429, 430, 520; 260/112 G

[56] References Cited

UNITED STATES PATENTS

| | | | |
|---|---|---|---|
| 2,631,111 | 3/1953 | Meyer | 260/112 G X |
| 3,142,571 | 7/1964 | McAnelly | 426/430 X |
| 3,840,515 | 10/1974 | Reiners et al. | 426/430 X |

OTHER PUBLICATIONS

Altschul, Aaron, *New Protein Foods*, (1974), pp. 271–272.

*Primary Examiner*—Raymond N. Jones
*Assistant Examiner*—Esther L. Massung
*Attorney, Agent, or Firm*—Neuman, Williams, Anderson & Olson

[57] ABSTRACT

Gluten is heat treated at a relatively high temperature for a short period and then is extracted with an organic solvent to improve filterability and purity. Mixtures of the purified gluten and other protein materials have high nutritional value.

5 Claims, No Drawings

GLUTEN TREATMENT

This invention relates to the treatment of corn gluten and to compositions containing the treated corn gluten.

In the wet milling of corn, a gluten fraction which contains a good percentage of protein is separated from starch and non-starch components of the corn, such as fiber. The usual method of recovering the gluten is by filtration or centrifugation of water slurries in which the gluten is suspended. The filtration of gluten slurries is somewhat difficult and time consuming because of the tendency of the filtering medium to become clogged by starch. Because of the food value of protein, it is desired not only to recover the protein in the gluten but to recover protein having a high degree of purity, i.e., relatively free of oil, color and off-flavor characteristics of gluten protein.

It is accordingly a principal object of this invention to provide an efficient method for recovering high purity protein from corn gluten.

It is another object of this invention to provide a corn gluten protein composition of high purity and good flavor.

It is still another object of the invention to provide highly nutritional compositions containing other protein material and the purified gluten protein obtained in accordance herewith.

In its broad aspect, the present invention involves heating corn gluten to a relatively high temperature for a short period and subsequently subjecting the corn gluten to extraction with a solvent. This combination of treatments provides a gluten protein product of high purity having good color and flavor characteristics.

In practice of the present process, corn gluten from which starch has been removed is slurried in water and the slurry heated to a temperature of from about 280° to 335° F. under a pressure of about 40 to 105 psig for a short period on the order of about 10 to 150 seconds. Generally, heating at a temperature of 280° to 285° F. at about 40 psig for about 2.5 minutes affords maximum filtration rates with good protein purity and recovery. Use of high heating temperatures and longer heating periods increases the filterability of the gluten but adversely affects the recovery of protein as well as its quality. Heating at temperatures such as 255° F. and lower for long periods of time, e.g. 10 minutes or more, is generally unsatisfactory to achieve good filtration rates and protein purity.

The effect of heating temperature and time is illustrated by the following example:

EXAMPLE 1

Aliquots of a gluten slurry containing 14.3% dry solids and 73.5% protein (DB—dry basis) were cooked in a jet cooker using high pressure steam at 310° F. for various periods shown below. The cooked product was filtered on a 7-inch Buchner funnel. The filtration rate was determined and the resulting gluten filter cake assayed as shown below in Table 1.

Table 1

| Cooking Time (seconds) | Filter Rate (ml/min.) | Solids % | Solids Recovery % | Protein % DB | Protein Recovery % |
|---|---|---|---|---|---|
| 0 | 21 | — | — | 73.5 | — |
| <10 | 90 | 32.8 | 77.0 | 82.2 | 88.0 |
| 10 | 152 | 33.6 | 76.2 | 86.3 | 89.7 |
| 420 | 223 | 39.3 | 70.9 | 87.8 | 83.9 |

As seen, the filtration rate increased markedly with increasing heating time but recovery of solids and protein was significantly lower at 420 seconds. In addition, more color developed at the higher temperature which is undesirable. A heating time of about 10 seconds appeared optimum, yielding good filtration rates with maximum protein and solids recovery.

In a similar test, gluten was cooked for 10- and 20-second intervals at 310° F. and filtered as above.

| Jet Cook Time (seconds) | Filtration Rate (ml/min.) | Filter Cake (color) |
|---|---|---|
| 10 | 118 | Yellow |
| 20 | 228 | Light Orange |

The filtration rate from the 20-second cook time was approximately twice as fast as for the 10-second cook time but the gluten color was darker.

After heat treatment, the gluten is then extracted with an organic solvent. Optionally and preferably for economy, before extraction the cooked gluten is dried to a moisture content of not more than about 10%. Drying can be accomplished by any conventional means, preferably low temperature means of dehydrating the extracted gluten, such as flash, vacuum drum, spray or freeze drying. Suitable extraction solvents include methanol, ethanol, isopropanol, n-propanol, acetone and the like. The extraction solvent should contain some water for optimum results and accordingly the organic solvents are diluted with water to give an organic solvent concentration of from 85 to 99% on a volume to volume basis (v/v).

A convenient procedure for conducting the extraction is to add to the gluten sufficient solvent to produce a pumpable slurry. Preferably, a weight ratio of 10:1, solvent to gluten, is employed, but this ratio can vary such as, for example, from about 7:1 to 15:1. The gluten-solvent slurry is maintained at ambient temperature for at least 15 minutes and then filtered.

The wet filter cake can be reslurried in fresh solvent or washed in place until the filtrate is essentially colorless. The filter cake can, if desired, be given a final wash with water to remove traces of solvent and dried, preferably under vacuum at temperatures of 60° to 70° C. The final product is a light tan powder having a bland flavor and containing on the order of 90% or more protein.

The invention and the advantages thereof are further illustrated by the following examples.

EXAMPLE 2

Corn gluten from which starch had been separated was diluted with water and jet cooked at 310° F. for about 10 seconds. The diluted gluten fed to the cooker contained 15.8% solids and 72.8% protein. The hot gluten at 176° F. was filtered through Whatman No. 1 paper. The filter cake was reslurried in water and freeze dried. The gluten filter cake, after drying, contained 2.0% moisture and 85.4% (dry basis) protein.

Five-gram aliquots of the freeze dried gluten were placed in 500 milliliter Erlenmeyer flasks, covered with 100 milliliters of isopropanol-water mixtures and shaken at 86° F. for 1 hour. In each case the slurry was centrifuged and the residue reslurried in 50 milliliters of isopropanol and filtered. The residues were dried at 205° F. for 3 hours. Analysis of the residues using different isopropanol-water mixtures is shown in Table 2.

Table 2

| Isopropanol/Water (% v/v) | Solids Recovery (%) | Color | Protein (% DB) | Protein Recovery (%) | Flavor |
|---|---|---|---|---|---|
| 50 | 58 | Tan | 87.7 | 61 | Bland |
| 60 | 56 | Tan | 85.7 | 58 | Bland |
| 70 | 54 | Cream | 85.9 | 56 | Bland |
| 80 | 63 | Cream | 88.6 | 67 | Bland |
| 90 | 70 | Cream | 90.1 | 75 | Bland |
| 100 | 90 | Yellow | 89.7 | 96 | Slightly Off Flavor |

The above results show maximum protein purity consistent with minimum product color is obtained with extraction using 90% isopropanol and 10% water. Some water is required to facilitate color removal because pure isopropanol did not extract the yellow pigment.

EXAMPLE 3

Ten-gram aliquots of freeze dried gluten which had been jet cooked and filtered as in Example 2 were covered with 140 milliliter portions of aqueous ethanol mixtures (special denatured ethanol, SDA-2B, denatured with 0.5 gallon rubber hydrocarbon in 100 gallons of 95% ethanol) and was stirred 30 minutes at ambient temperature (75° F.). The samples were filtered and washed with 260 milliliters of the same solvent. The filter cake was dried overnight at 167° F. under vacuum. Analysis of the product is shown in Table 3.

Table 3

| Ethanol/Water (% v/v) | Solids Recovery (%) | Color | Protein (% DB) | Protein Recovery (%) | Flavor |
|---|---|---|---|---|---|
| 75 | 75 | Yellow-Green | 85.7 | 77.3 | Slight Bitter |
| 85 | 79 | Yellow-Green | 88.8 | 84.5 | Slight Bitter |
| 90 | 80 | Tan | 90.1 | 86.0 | Bland |
| 95 | 82 | Tan | 91.3 | 89.6 | Bland |

In this run highest product purity with best color and flavor was obtained with 90-95% ethanol.

EXAMPLE 4

After heat treatment and filtration as in Example 2, 25 grams of dry gluten (96.3%(dry solids), 85.0% protein (dry basis)) was extracted with 200 milliliters of 100% 1-propanol by stirring at 75° F. for 30 minutes. To decolorize, the slurry was filtered and washed with 250 milliliters of 85 to 90% 1-propanol. The residue was dried overnight at 122° F. and analyzed as shown below:

| | |
|---|---|
| Solids, % | 94.2 |
| Solids Recovery, % | 80.5 |
| Protein, % (dry basis) | 92.6 |
| Protein Recovery, % | 88.2 |
| Color | Light Tan |
| Flavor | Bland |

EXAMPLE 5

One hundred thirty-nine grams of cooked and filtered gluten (as in Example 2) were extracted with 1,900 milliliters of 88% (v/v) aqueous methanol at 122° F. for 15 minutes, filtered and washed with about 2,000 milliliters of methanol. The residue was air dried and assayed as follows:

| | |
|---|---|
| Solids, % | 93.7 |
| Solids Recovery, % | 70.0 |
| Protein, % (dry basis)* | 87.3 |
| Protein Recovery, % | 74.0 |
| Color | Cream-Tan |
| Flavor | Bland |

*Starting gluten 83.5% (dry basis) protein.

EXAMPLE 6

In this experiment, 1,000 grams of cooked and filtered gluten containing 41.6% dry solids and 85.4% (dry basis) protein, were mixed with 3,500 milliliters of aqueous isopropanol and stirred one hour. Isopropanol concentration was 85% v/v and the ratio of solvent:solids was 10:1. After filtration, the cake was washed twice by reslurrying in 2,000 milliliter aliquots of isopropanol and finally washed in place with 1,200 milliliters of isopropanol. The filter cake was air dried and assayed.

| | |
|---|---|
| Grams | 310 |
| Solids, % | 90.7 |
| Protein, % (dry basis) | 94.3 |
| Protein Recovery, % | 76.0 |
| Solids Recovery, % | 69.0 |
| Ash, % (dry basis) | 2.77 |
| Fat, % (dry basis) | 1.7 |
| Color | Cream |
| Flavor | Bland |

EXAMPLE 7

Twenty-five gram portions of gluten (84.7% (dry basis) protein) cooked and dried as in Example 2 were covered with 200 milliliters of 95% (v/v) aqueous isopropanol and stirred magnetically for 30 minutes at 75, 102° and 127° F. The slurries were filtered and washed with 200 milliliters of 93% isopropanol. The residues were dried overnight at 149° F. under vacuum. The results from the analysis of the dried products are shown below:

| Temperature (° F) | Solids Recovery (%) | Protein (% DB) | Protein Recovery (%) | Color | Flavor |
|---|---|---|---|---|---|
| 75 | 83 | 91.0 | 88.5 | Tan-Cream | Bland |
| 102 | 74 | 90.8 | 78.4 | Tan-Cream | Bland |
| 127 | 70 | 89.8 | 73.2 | Cream | Bland |

Although color and flavor are acceptable in all cases, maximum purity and recovery was obtained at the lowest extraction temperature — 75° F.

The importance of the cooking or heating step in obtaining the beneficial results of this invention is shown in the several following examples wherein uncooked gluten is used.

EXAMPLE 8

A gluten cake from which starch had been separated by filtration was reslurried in water and freeze dried. This material contained 96.0% (dry solids and 74.4% protein.

Six hundred sixty grams of this gluten material were covered with 6,000 milliliters of aqueous isopropanol (99% v/v) and stirred one hour at 104°–122° F. and then filtered. The cake was reslurried in 2,000 milliliters of fresh isopropanol and filtered. The cake was washed with an additional 1,500 milliliters isopropanol and air dried overnight. Assay of the dried product showed:

| | |
|---|---|
| Solids, % | 90.0 |
| Protein, % (dry basis) | 80.4 |
| Solids Recovery, % | 95.0 |
| Protein Recovery, % | 96.0 |
| Ash, % (dry basis) | 4.1 |
| Fat, % (dry basis) | 0.13 |
| Color | Cream-Yellow |
| Flavor | Slight Bitter to Bland |

EXAMPLE 9

An experiment similar to Example 8 was carried out except aqueous ethanol (95% v/v) was employed instead of isopropanol. In this case 140 grams of the same gluten material used in Example 8 were covered with 1,300 milliliters of 95% ethanol and stirred one hour at 104°–122° F. After filtration the cake was washed with an additional 1,250 milliliters of ethanol. The residue was air dried and assayed with the following results:

| | |
|---|---|
| Solids, % | 89.7 |
| Protein, % (dry basis) | 74.6 |
| Solids Recovery, % | 68.0 |
| Protein Recovery, % | 71.0 |
| Color | Tan-Brown |
| Flavor | Slight Bitter |

EXAMPLE 10

An experiment similar to Examples 8 and 9 was carried out using methanol. In this experiment 200 grams of spray dried, non-cooked gluten (72.8% (dry basis) protein, 96.5% dry solids) were extracted with 2,600 milliliters of aqueous methanol (99% v/v) at 122° F. for 15 minutes and then filtered. The filter cake was washed in place with additional methanol until the filtrate was essentially colorless. The filter cake was air dried and assayed. The results showed:

| | |
|---|---|
| Solids, % | 93.3 |
| Protein, % (dry basis) | 77.7 |
| Solids Recovery, % | 85.0 |
| Protein Recovery, % | 91.0 |
| Color | Cream-White |
| Flavor | Slight Bitter |

The effect of solvent extraction starting with non-cooked gluten as in Examples 8, 9 and 10 is summarized below:

| Example | Solvent | Alcohol Concentration % | % DB Protein Before Extraction | % DB Protein After Extraction |
|---|---|---|---|---|
| 8 | Isopropanol | 99 | 74.4 | 80.4 |
| 9 | Ethanol | 95 | 74.4 | 74.6 |
| 10 | Methanol | 99 | 72.8 | 77.7 |

The results of Examples 8, 9 and 10 point up that protein purity is increased only by about 6% when non-cooked gluten is extracted with organic solvents. In addition, flavor is inferior to those products prepared from solvent-extracted gluten which has been cooked and filtered. Apparently with cooked gluten the major protein purification occurs in the cooking and filtration step (see Example 1) which largely removes bound starch and inorganic impurities. Subsequent solvent extraction removes lipid and pigment materials and results in a product with greater than 90% protein and improved flavor and color.

EXAMPLE 11

The nutritional characteristics of purified gluten were compared to proteins from soy isolate, casein and blends of soy isolate and gluten by carrying out PER (Protein Efficiency Ratio) tests on white rats.

Purified gluten was prepared in the following manner. A gluten slurry at about 16% solids was cooked at 310° F. for about 10 seconds at 60 psig and filtered. The filtered gluten, after freeze drying, assayed 96.7% solids and 84.0% (dry basis) protein. Five hundred sixty grams of this material was slurried in 4,600 milliliters of 95% ethanol for 1 hour at 104°–122° F., filtered and the cake was reslurried twice in 3,000 and 2,000 milliliter portions of alcohol. The gluten residue was air dried overnight and ground in a Wiley Mill. Analysis showed:

| | |
|---|---|
| Solids, % | 91.5 |

| | |
|---|---|
| Protein, % (dry basis) | 91.5 |
| Ash, % (dry basis) | 1.95 |
| Color | Light Tan |
| Flavor | Bland |
| Grams | 415 |

Protein Efficiency Ratio studies were carried out by feeding groups of male weanling rats a 10% protein diet, formulated as described in "Methods of Analysis", AOAC, 11th Edition, page 800 (1970). The test materials were incorporated into the basal diets at a level of 10% protein. The PER results of this test after four weeks were:

| | |
|---|---|
| Purified Gluten | 0.74 |
| Commercial Soy Isolate | 1.25 |
| Purified Gluten:Commercial Soy Isolate (1:2) | 2.27 |
| Casein | 2.5 |

It is readily apparent from these data that the combination of treated gluten:soy isolate is nutritionally superior to either the soy or gluten alone. The reason for this synergistic effect is not known.

EXAMPLE 12

Gluten was jet cooked and filtered as described in Example 2. The filtered cooked gluten (1300 grams at 33.1% dry solids, 87.8% (dry basis) protein) was covered with 4,935 milliliters of isopropanol, stirred at 122° F. for 30 minutes and filtered. The cake was re-slurried in 2,000 milliliters of 85% isopropanol, filtered, and then washed in place with 1,000 milliliters of pure isopropanol. After air drying overnight the dry product (280 grams) was assayed.

| | |
|---|---|
| Solids, % | 91.8 |
| Protein, % (dry basis) | 91.0 |
| Ash, % (dry basis) | 2.5 |
| Fat, % (dry basis) | 0.46 |
| Solids Recovery, % | 60.0 |
| Protein Recovery, % | 62.0 |
| Color | Tan-Cream |
| Flavor | Bland |

Additional gluten material was prepared in the same manner as described immediately above until a total of about 800 grams of product was obtained. These two gluten materials were combined and when blended together the final product assayed:

| | |
|---|---|
| Solids, % | 93.5 |
| Protein, % (dry basis) | 90.8 |
| Ash, % (dry basis) | 3.0 |
| Fat, % (dry basis) | 0.44 |
| Grams | 797 |

The following blends of soy isolate (90% protein) and purified gluten were prepared:

| Sample | % Gluten | % Soy Isolate |
|---|---|---|
| 1 | 20 | 80 |
| 2 | 30 | 70 |
| 3 | 40 | 60 |
| 4 | 60 | 40 |
| 5 | 0 | 100 |

Samples 1 through 5 were incorporated in the diet of white rats at a 10% protein level and Protein Efficiency Ratio studies conducted as described in "Methods of Analysis", AOAC, 11th Edition, page 800 (1970). The results of these tests, after four weeks, are shown below:

| Sample | PER (4 Weeks) |
|---|---|
| 1 20% Gluten:80% Soy | 1.79 |
| 2 30% Gluten:70% Soy | 2.22 |
| 3 40% Gluten:60% Soy | 2.21 |
| 4 60% Gluten:40% Soy | 2.07 |
| 5 0 Gluten:100% Soy | 0.76 |
| 6 Casein Control | 2.50 |

These above results show the optimum ratio of gluten/soy to be between 30/70 and 40/60, although all samples containing gluten were markedly higher in PER than soy isolate alone.

As seen from Examples 11 and 12, when gluten purified in accordance with this invention is mixed with soy protein, the Protein Efficiency Ratio (PER) of the mixture is substantially higher than either of the protein sources alone. Also, the flavor of the mixture is improved over that of soy protein alone with no decrease in protein purity. Thus, blends of the purified gluten protein and soy protein or other vegetable proteins are particularly desirable for use, for example, as a meat extender in hamburgers, weiners, etc., for protein fortification of bakery products such as bread, cookies and doughnuts and as snack foods. The purified gluten protein can be used alone for these applications with somewhat reduced nutritional advantage.

The effect on filterability of heating gluten at various temperatures is shown in the following table. The gluten initially assayed 13.8% solids and 10.5% protein as is or 76.0% dry basis.

| | | | | Filter Cake Analysis | | |
|---|---|---|---|---|---|---|
| °F | Psi | Time | Fiter Rate | Solids Recovery | Protein Recovery | Protein Purity |
| | | | (ml/min) | (%) | (%) | (%) |
| 248 | 20 | 10 seconds | 1.7 | 73 | 73.3 | 76.0 |
| 276 | 42 | 10 seconds | 24 | 70 | 69.9 | 81.3 |
| 312 | 70 | 10 seconds | 142 | 73 | 80.0 | 83.2 |
| 335 | 100 | 10 seconds | 92 | 69 | 76.7 | 84.0 |
| 253 | 21 | 2.5 minutes | 14.5 | 79 | 78.8 | 77.3 |
| 283 | 40 | 2.5 minutes | 180 | 73 | 80.9 | 84.0 |
| 310 | 72 | 2.5 minutes | 152 | 72 | 80.0 | 84.0 |

-continued

| °F | Psi | Time | Filter Rate | Filter Cake Analysis | | |
|---|---|---|---|---|---|---|
| | | | | Solids Recovery | Protein Recovery | Protein Purity |
| 335 | 105 | 2.5 minutes | 119 | 73 | 80.6 | 84.1 |

Those modifications and equivalents which fall within the spirit of the invention are to be considered a part thereof.

What is claimed is:

1. A method of treating gluten which comprises heating gluten to a temperature above about 255° F. under pressure for a period of not more than 420 seconds, filtering the gluten and then extracting the gluten with a water-containing, water-miscible organic solvent selected from the group consisting of ethanol, propanol, isopropanol and acetone, separating the solvent and recovering purified gluten.

2. A method in accordance with claim 1 wherein after heating and before extracting the gluten is filtered and dried to a moisture content of not more than about 10%.

3. A method in accordance with claim 1 wherein the solvent employed contains from about 1 to 15% water.

4. A method of treating gluten which comprises heating gluten to a temperature of about 280° to 335° F. under pressure for a period of nor more than 420 seconds, filtering the gluten and then extracting the gluten with a water-containing, water-miscible organic solvent selected from the group consisting of ethanol, propanol, isopropanol and acetone, separating the solvent and recovering purified gluten.

5. A method of treating gluten which comprises heating gluten to a temperature of about 280° F. at a pressure of about 40 psig for about 2.5 minutes, filtering the gluten and then extracting the gluten with a water-containing, water-miscible organic solvent selected from the group consisting of ethanol, propanol, isopropanol and acetone, separating the solvent and recovering purified gluten.

* * * * *